H. C. WALTER.
GEARING.
APPLICATION FILED MAR. 19, 1917.

1,286,849.

Patented Dec. 3, 1918.
2 SHEETS—SHEET 1.

Inventor:
Henry C. Walter,
by Emery, Booth, Janney & Varney
Attys.

H. C. WALTER.
GEARING.
APPLICATION FILED MAR. 19, 1917.

1,286,849.

Patented Dec. 3, 1918.
2 SHEETS—SHEET 2.

Inventor:
Henry C. Walter.
by Emery, Booth, Janney & Varney
Attys.

UNITED STATES PATENT OFFICE.

HENRY C. WALTER, OF BRIDGEPORT, CONNECTICUT, ASSIGNOR TO THE LOCOMOBILE COMPANY OF AMERICA, OF BRIDGEPORT, CONNECTICUT, A CORPORATION OF WEST VIRGINIA.

GEARING.

1,286,849.

Specification of Letters Patent.   Patented Dec. 3, 1918.

Application filed March 19, 1917. Serial No. 155,635.

*To all whom it may concern:*

Be it known that I, HENRY C. WALTER, a citizen of the United States, and a resident of Bridgeport, county of Fairfield, and State of Connecticut, have invented an Improvement in Gearings, of which the following description, in connection with the accompanying drawings, is a specification, like characters on the drawings representing like parts.

This invention relates to toothed gearing, and is more especially concerned with gearing of a special type in which each tooth has portions oppositely inclined with relation to the axis of the gear as viewed from the periphery or face thereof, such as exemplified by the gearing of United States Letters Patent No. 1,213,311, issued January 23rd, 1917, to The Locomobile Company of America as my assignee.

My invention will be best understood by reference to the following specification, when taken in connection with the accompanying drawings of one specific embodiment thereof, while its scope will be more particularly pointed out in the appended claims.

Figure 3:
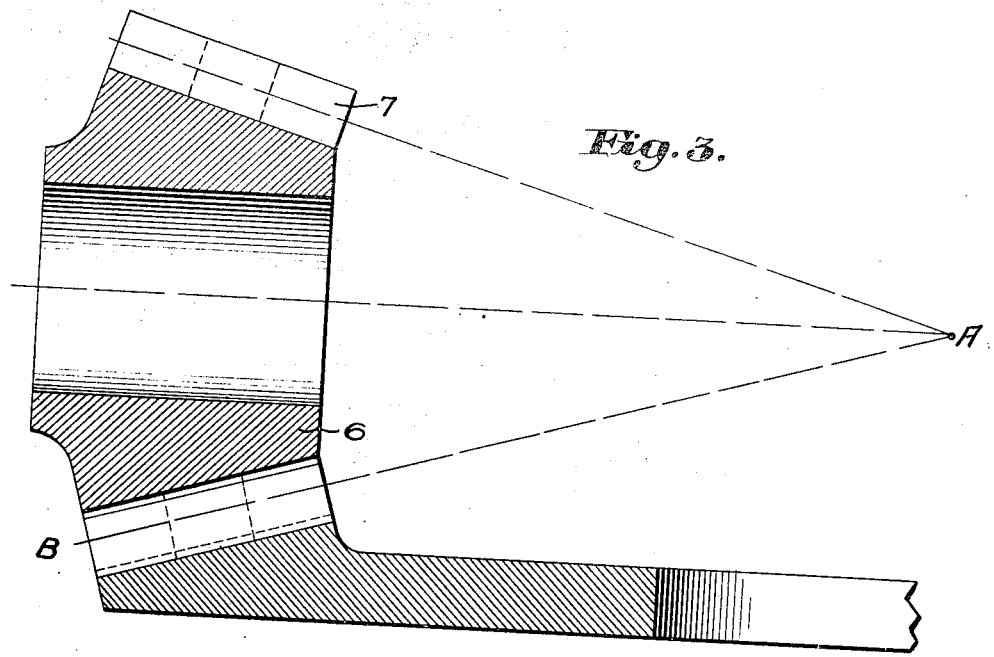
Fig. 3 is a sectional view on line 3—3 of Fig. 1, looking toward the left.

Referring to the drawings, and to the embodiment of my invention which I have selected for illustration, while my present invention is applicable to spur gears, I have herein shown for purposes of exemplification a bevel gear 5 and a pinion 6 whose pitch cones have a common apex A, while the line A—B in Fig. 3 represents an element common to the rolling surfaces of the two pitch cones. In other words, the line A—B represents the line of contact of two imaginary cones.

The gear 5 is provided with teeth 7 and the pinion 6 with teeth 8 whose pitch and width of face may be suitable for the nature of the work to be performed and the power to be transmitted. It is deemed unnecessary here to discuss the dimensions of the teeth and the method employed in designing the form and angle of the tooth flank, since these matters are well known to those skilled in the art, and should require no further comment. The teeth are preferably of substantially uniform depth from end to end (see Fig. 3) and suitable clearances are provided at the top and root thereof as indicated in Fig. 3, these clearance spaces being also preferably of substantially uniform depth from end to end.

Figure 4:
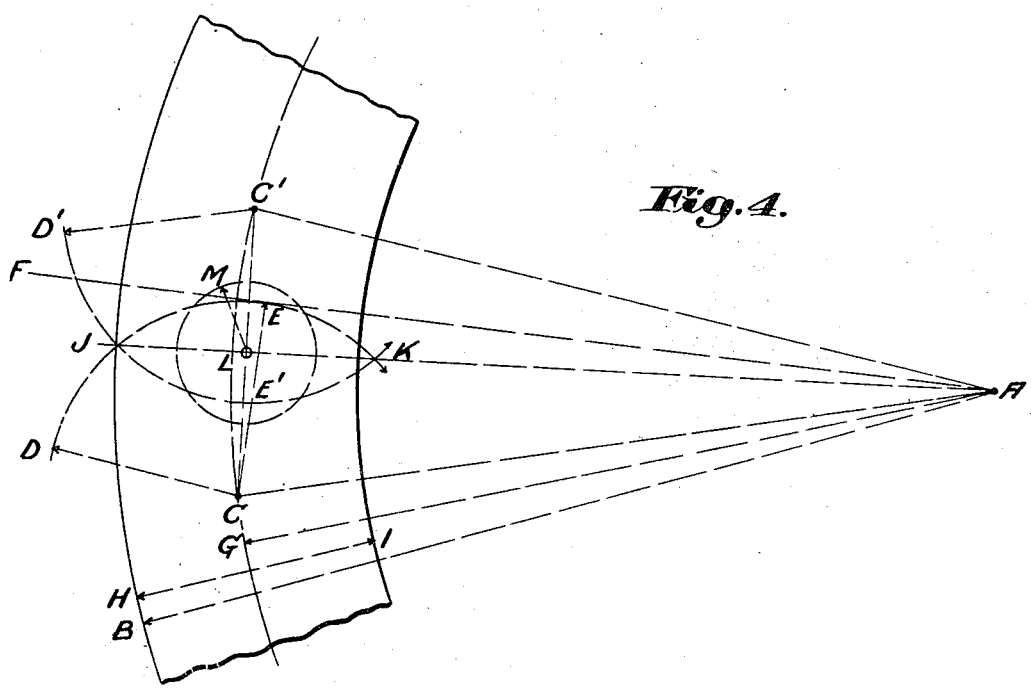
Fig. 4 is a layout or diagram representing the mode of laying out the tooth curve on the development of the pitch cone of the gear.

While my present invention may be employed in connection with common herringbone gears, in the present example as already indicated, I have applied it to the special form of tooth which constitutes the the subject matter of the aforesaid patent, in which the tooth is laid out in the following manner: Referring to Fig. 4, I have there shown a diagram representing graphically the layout of the tooth curve on the development of the face of the gear. It should here be noted that each tooth is curved from end to end on an arc of a circle, and that the same radius is used for both sides of the tooth at the pitch line, or more accurately speaking, in the surface of the pitch cone. This radius is represented by the line C—D in Fig. 4.

The location of the center C from which this radius is struck may be arbitrarily selected within certain limits, the only essential being, however, that the point of tangency E of the arc to the radial line A—F drawn from the cone center (Fig. 4) shall be intermediate the ends of the tooth—that is to say, it should lie within the face of the gear. It will be understood that when the point of tangency is located as just described, the two portions of the teeth on opposite sides of this point exert thrusts in opposite directions, respectively, so that one counteracts the other much in the same sense that the opposed angular tooth surfaces of a common herringbone type of gear oppose each other. In the example selected for illustration, the center C from which the arc on the radius C—D is struck is located in an arc struck from the center A on the radius A—G. The latter radius will, in practice, be determined arbitrarily. In the present instance, it is such that the point of tangency E is located somewhat nearer the inner end of the tooth—that is to say, it is not exactly midway between the ends of the tooth.

Figure 1:
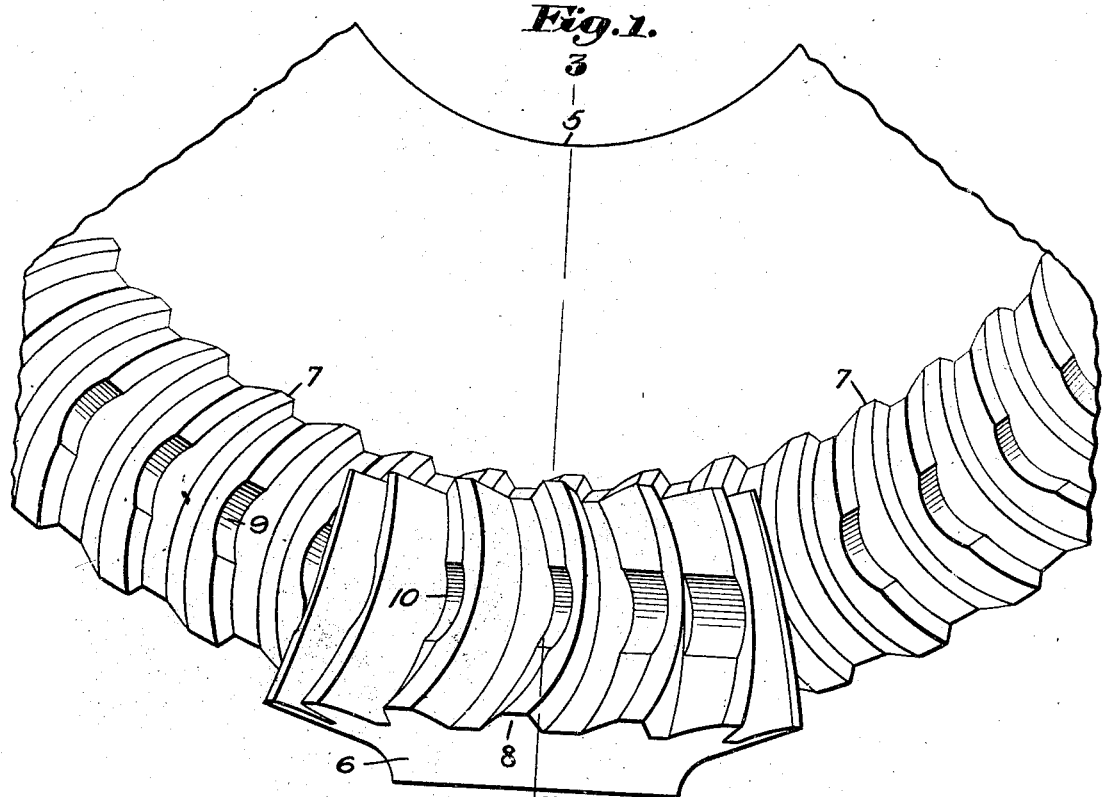
Figure 1 is a plan of a portion of a bevel gear and pinion embodying my invention.
Figure 2:
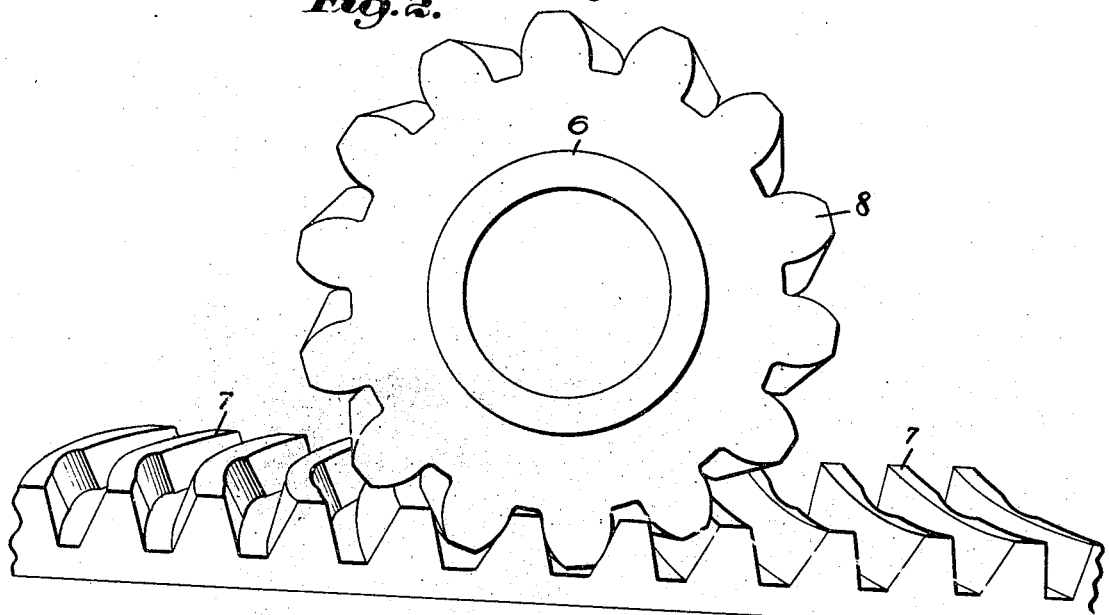
Fig. 2 is an elevation of the same as viewed from the outer end of the pinion.

The width of the face is indicated by the line H—I intersecting the two arcs which represent the outer and inner limits of the gear face. If the teeth of the gear are cut right-hand, so to speak, the teeth of the pinion will be cut left-hand; that is to say, viewing the face of the gear and pinion as seen in Fig. 1 for example, the uppermost teeth of the pinion have a curve which is opposite to that of the teeth of the gear. This is represented diagrammatically in Fig. 4, by laying out a second arc corresponding to the arc drawn on the radius C—D. This second arc for the purpose of comparison I have designated C'—D', its center C' being located within a circle struck on the radius A—G. The distance from the center C to the center C' in Fig. 4 is such that the arcs struck therefrom on the radii C—D and C'—D' intersect at a point J in the circle struck from the center A on the radius A—B, and which represents the outer circle of the gear face.

It will now be observed that the two arcs struck from the centers C and C' have another point of intersection K, which falls outside of the gear face whose width is represented by the line H—I. As before stated, however, the distribution of the arc of the tooth within the width of the gear face is a matter of selection within certain limits already defined. In the present instance, the point of tangency E is located somewhat nearer the inner circumference of the gear face than the outer, with the result that the inward pressure of the teeth is very slightly greater than the outer pressure, the tendency therefore being to move the pinion toward the center of the gear. Although this is not at all necessary it has been done in the present instance with a view to distributing the wear better on the flanks of the terminal portions of the teeth.

As thus far described, the gears selected for purposes of exemplification are identical with those forming the subject matter of the aforesaid patent.

In accordance with my present invention, the gears of said patent are modified and improved by providing each tooth 7 of the gear with a recess 9, and by providing each tooth 8 of the pinion with a similar recess 10. Such recesses in each case are intermediate two oppositely inclined portions of the tooth. These recesses provide clearance spaces intermediate two inclined working flank surfaces of each tooth, with the result that the central portion is removed or cut away, and there remain only those two parts of each tooth which are inclined to a substantial degree. The elimination of this portion of the contacting surface of the tooth flank is found to produce a gear still quieter in its action than that of said patent, while still preserving the advantages of absence of end thrust. This increased quietness of action is due to the fact that I have eliminated that portion of the flank which resembles in a general way, or may be likened to, common forms of straight teeth, and thus utilize only those portions of the curved flank as are inclined to a substantial extent. In this way, I secure the advantages of a tooth having a sliding action throughout, similar to helically cut gears.

While the recesses 9 and 10 may be otherwise suitably formed, they are herein recessed on an arc of a circle struck from a center intermediate the ends of such tooth, and having a radius substantially less than that of the arc on which the teeth faces are formed. This arc is represented diagrammatically in Fig. 4 by a circle struck from the center L with any arbitrary radius, as for example the radius L—M. It will be observed that the center of this arc, as well as that of the arc on which the tooth is formed, lie in a plane intersecting the axis of the gear or pinion, as the case may be.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. A pair of mating gears whose teeth have portions oppositely inclined with relation to the axis as viewed from the periphery or face of the gear, each of said teeth having its flank provided with a recess intermediate two oppositely inclined portions of the tooth, said recess being formed on a curve differing from that of said tooth flank.

2. A pair of mating gears whose teeth have portions oppositely inclined with relation to the axis as viewed from the periphery or face of the gear, and each of said teeth having the central portion of its flank recessed to provide an arcuate clearance space intermediate two inclined working flank surfaces.

3. A pair of mating gears whose teeth are each formed on an arc of a circle struck from a center intermediate the ends of such tooth, each of said teeth having the central portion of its flank recessed to provide a clearance space intermediate two contacting flank surfaces.

4. A pair of mating gears whose teeth have portions oppositely inclined with relation to the axis as viewed from the periphery or face of the gear, each of said teeth having its flank provided with a recess formed on an arc of a circle struck from a center intermediate the ends of such tooth and cutting the tooth flank at oppositely inclined portions thereof.

5. A pair of mating gears whose teeth are each formed on an arc of a circle struck from a center intermediate the ends of such tooth, each of said teeth having the central portion of its flank recessed on an arc of a circle struck from a center intermediate the ends of such tooth and of a radius substantially less than that of the first mentioned circle.

6. A pair of mating gears whose teeth are each formed on an arc of a circle struck from a center intermediate the ends of such tooth, each of said teeth having the central portion of its flank recessed on an arc of a circle struck from a center intermediate the ends of such tooth and of a radius substantially less than that of the first mentioned circle, the centers of both said arcs being in one plane intersecting the axis of the gear.

In testimony whereof I have signed my name to this specification.

HENRY C. WALTER.